US012646252B2

(12) United States Patent
Afrasiabi et al.

(10) Patent No.: US 12,646,252 B2
(45) Date of Patent: Jun. 2, 2026

(54) IMAGE-BASED VALIDATION OF A TARGET OBJECT RELATIVE TO A 3D CONTROL MODEL

(71) Applicant: The Boeing Company, Arlington, VA (US)

(72) Inventors: Amir Afrasiabi, Fircrest, WA (US); Sina Rafati, Austin, TX (US); Daniel Quick, Defiance, MO (US); Brent Hadley, Kent, WA (US); Philip Freeman, Summerville, SC (US); George Hagler, Huntsville, AL (US)

(73) Assignee: The Boeing Company, Arlington, VA (US)

( * ) Notice: Subject to any disclaimer, the term of this patent is extended or adjusted under 35 U.S.C. 154(b) by 217 days.

(21) Appl. No.: 18/477,354

(22) Filed: Sep. 28, 2023

(65) Prior Publication Data

US 2025/0111603 A1 Apr. 3, 2025

(51) Int. Cl.
| | |
|---|---|
| *G06T 17/00* | (2006.01) |
| *G06V 10/74* | (2022.01) |
| *H04N 13/351* | (2018.01) |

(52) U.S. Cl.
CPC ............ *G06T 17/00* (2013.01); *G06V 10/761* (2022.01); *H04N 13/351* (2018.05)

(58) Field of Classification Search
CPC ..... G06T 17/00; G06V 10/761; H04N 13/351
See application file for complete search history.

(56) References Cited

U.S. PATENT DOCUMENTS

| | | | | |
|---|---|---|---|---|
| 2010/0315416 A1* | 12/2010 | Pretlove | ................... | G06T 7/33 |
| | | | | 345/419 |
| 2012/0130521 A1* | 5/2012 | Kohlhoff | ................ | G06T 19/00 |
| | | | | 700/98 |
| 2022/0289403 A1* | 9/2022 | Afrasiabi | ............... | G06V 20/64 |

* cited by examiner

*Primary Examiner* — Haixia Du
(74) *Attorney, Agent, or Firm* — Alleman Hall LLP

(57) ABSTRACT

A system for image-based validation of a target object relative to a 3D control model is configured to retrieve a 3D control model, identify coordinates for each of the components, determine virtual camera locations using a camera placement algorithm to enable a multi-view image capture of all the components of the 3D control model, position virtual cameras at the determined camera locations, capture, by real-life cameras positioned at real-life camera locations respectively corresponding to the virtual camera locations, a 3D target model of the target object, receive the 3D target model captured by the real-life cameras, generate 2D target planar images of the target object, generate 2D control planar images of the control object, detect at least one difference between the 2D target planar images and the 2D control planar images, generate a validation output indicating the at least one difference, and output the validation output.

20 Claims, 13 Drawing Sheets

Figure 3:
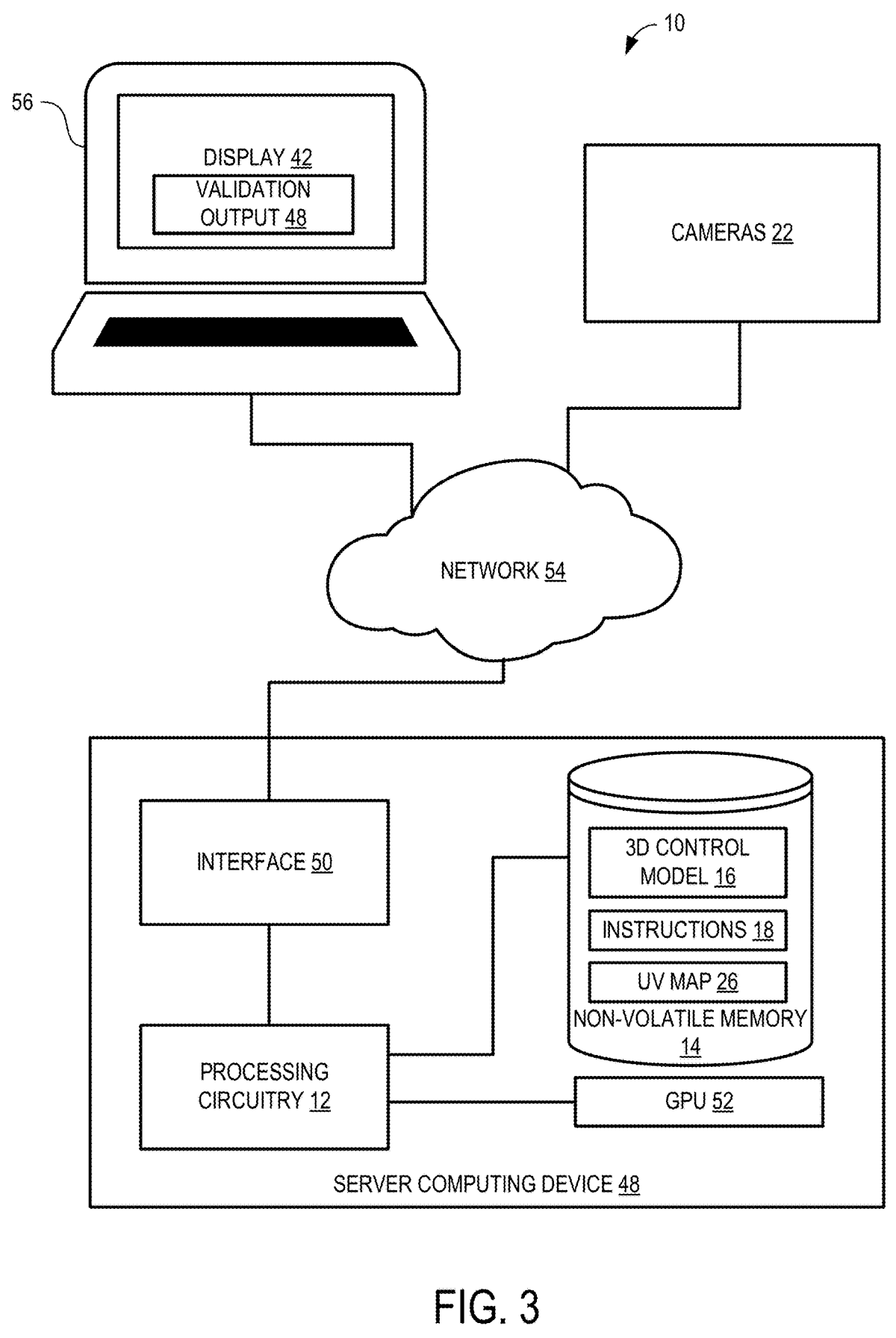

10

56

DISPLAY 42

VALIDATION
OUTPUT 48

CAMERAS 22

NETWORK 54

SERVER COMPUTING DEVICE 48

INTERFACE 50

PROCESSING
CIRCUITRY 12

3D CONTROL
MODEL 16

INSTRUCTIONS 18

UV MAP 26

NON-VOLATILE MEMORY
14

GPU 52

RETRIEVE FROM THE NON-VOLATILE MEMORY THE 3D CONTROL MODEL COMPRISING A PLURALITY OF COMPONENTS 102

IDENTIFY, FROM THE 3D CONTROL MODEL, COORDINATES FOR EACH OF THE PLURALITY OF COMPONENTS 104

DETERMINE A PLURALITY OF VIRTUAL CAMERA LOCATIONS USING A CAMERA PLACEMENT ALGORITHM CONFIGURED TO COMPUTE A SET OF THE PLURALITY OF VIRTUAL CAMERA LOCATIONS AND PERFORM A MULTI-VIEW IMAGE CAPTURE OF ALL THE COMPONENTS OF THE 3D CONTROL MODEL AT RESPECTIVE COORDINATES OF THE PLURALITY OF COMPONENTS 106

POSITION VIRTUAL CAMERAS AT THE DETERMINED PLURALITY OF VIRTUAL CAMERA LOCATIONS 108

GENERATE 2D CONTROL PLANAR IMAGES OF THE CONTROL OBJECT BASED ON THE 3D CONTROL MODEL, THE 2D CONTROL PLANAR IMAGES CORRESPONDING TO THE 2D TARGET PLANAR IMAGES OF THE TARGET OBJECT 116

CAPTURE, BY A PLURALITY OF REAL-LIFE CAMERAS POSITIONED AT REAL-LIFE CAMERA LOCATIONS RESPECTIVELY CORRESPONDING TO THE PLURALITY OF VIRTUAL CAMERA LOCATIONS, A 3D TARGET MODEL OF THE TARGET OBJECT 110

RECEIVE THE 3D TARGET MODEL CAPTURED BY THE PLURALITY OF REAL-LIFE CAMERAS 112

GENERATE 2D TARGET PLANAR IMAGES OF THE TARGET OBJECT BASED ON THE 3D TARGET MODEL 114

DETECT AT LEAST ONE DIFFERENCE BETWEEN THE 2D TARGET PLANAR IMAGES AND THE 2D CONTROL PLANAR IMAGES 118

GENERATE A VALIDATION OUTPUT INDICATING THE AT LEAST ONE DIFFERENCE 120

OUTPUT THE VALIDATION OUTPUT 122

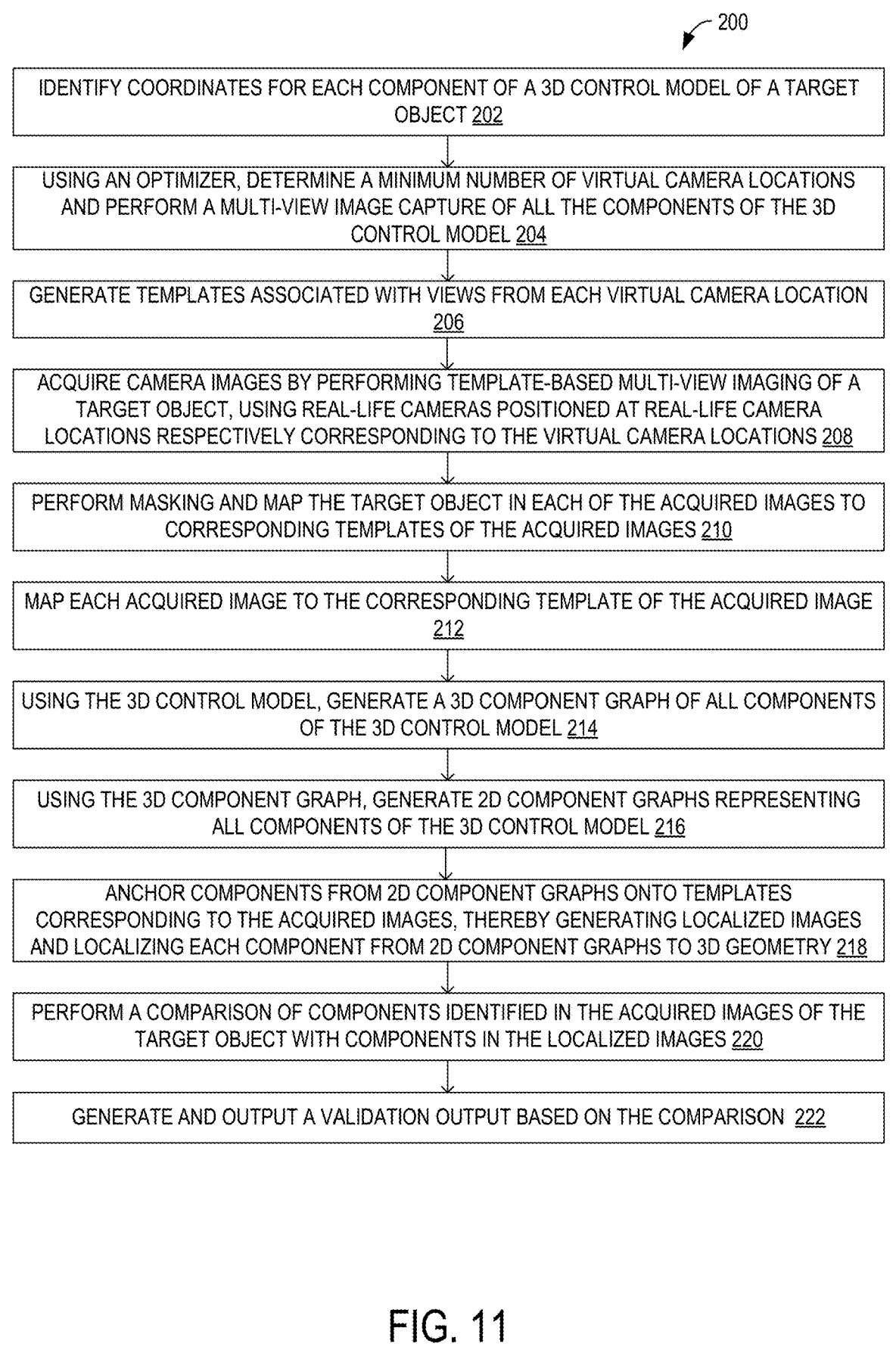

IDENTIFY COORDINATES FOR EACH COMPONENT OF A 3D CONTROL MODEL OF A TARGET OBJECT 202

USING AN OPTIMIZER, DETERMINE A MINIMUM NUMBER OF VIRTUAL CAMERA LOCATIONS AND PERFORM A MULTI-VIEW IMAGE CAPTURE OF ALL THE COMPONENTS OF THE 3D CONTROL MODEL 204

GENERATE TEMPLATES ASSOCIATED WITH VIEWS FROM EACH VIRTUAL CAMERA LOCATION 206

ACQUIRE CAMERA IMAGES BY PERFORMING TEMPLATE-BASED MULTI-VIEW IMAGING OF A TARGET OBJECT, USING REAL-LIFE CAMERAS POSITIONED AT REAL-LIFE CAMERA LOCATIONS RESPECTIVELY CORRESPONDING TO THE VIRTUAL CAMERA LOCATIONS 208

PERFORM MASKING AND MAP THE TARGET OBJECT IN EACH OF THE ACQUIRED IMAGES TO CORRESPONDING TEMPLATES OF THE ACQUIRED IMAGES 210

MAP EACH ACQUIRED IMAGE TO THE CORRESPONDING TEMPLATE OF THE ACQUIRED IMAGE 212

USING THE 3D CONTROL MODEL, GENERATE A 3D COMPONENT GRAPH OF ALL COMPONENTS OF THE 3D CONTROL MODEL 214

USING THE 3D COMPONENT GRAPH, GENERATE 2D COMPONENT GRAPHS REPRESENTING ALL COMPONENTS OF THE 3D CONTROL MODEL 216

ANCHOR COMPONENTS FROM 2D COMPONENT GRAPHS ONTO TEMPLATES CORRESPONDING TO THE ACQUIRED IMAGES, THEREBY GENERATING LOCALIZED IMAGES AND LOCALIZING EACH COMPONENT FROM 2D COMPONENT GRAPHS TO 3D GEOMETRY 218

PERFORM A COMPARISON OF COMPONENTS IDENTIFIED IN THE ACQUIRED IMAGES OF THE TARGET OBJECT WITH COMPONENTS IN THE LOCALIZED IMAGES 220

GENERATE AND OUTPUT A VALIDATION OUTPUT BASED ON THE COMPARISON 222

FIG. 11

IMAGE-BASED VALIDATION OF A TARGET OBJECT RELATIVE TO A 3D CONTROL MODEL

FIELD

The present disclosure relates generally to aircraft inspection and, in particular, to the inspection of manufactured or assembled parts of aircraft using three-dimensional modeling.

BACKGROUND

In aircraft manufacturing, inspections of manufactured or assembled parts are performed to find defects and anomalies. Existing visual inspections of components of the aircraft rely primarily on human visual acuity and can therefore be subjective. In addition, visual inspections can be swayed by human interpretation. The ability to promptly identify and address aircraft component defects and anomalies can minimize potential delays due to rework. In addition, there is a demand for a consistent quality inspection process that can be implemented not only at a manufacturer's facility but also at other sites, where there may be less expertise on potential issues and inspection criteria than at a manufacturer's site.

SUMMARY

In view of the above, a system for image-based validation of a target object relative to a 3D control model is provided, including processing circuitry, communicatively coupled to non-volatile memory storing the 3D control model of a control object and instructions that, when executed by the processing circuitry, cause the processing circuitry to retrieve from the non-volatile memory the 3D control model comprising a plurality of components, identify, from the 3D control model, coordinates for each of the plurality of components, determine a plurality of virtual camera locations using a camera placement algorithm configured to compute a set of the plurality of virtual camera locations that enable a multi-view image capture of all the components of the 3D control model at respective coordinates of the plurality of components, position virtual cameras at the determined plurality of virtual camera locations, capture, by a plurality of real-life cameras positioned at real-life camera locations respectively corresponding to the plurality of virtual camera locations, a 3D target model of the target object, receive the 3D target model captured by the plurality of real-life cameras, generate 2D target planar images of the target object based on the 3D target model, generate 2D control planar images of the control object based on the 3D control model, the 2D control planar images corresponding to the 2D target planar images of the target object, detect at least one difference between the 2D target planar images and the 2D control planar images, generate a validation output indicating the at least one difference, and output the validation output.

The features, functions, and advantages that have been discussed can be achieved independently in various embodiments or can be combined in yet other embodiments further details of which can be seen with reference to the following description and drawings.

BRIEF DESCRIPTION OF THE DRAWINGS

FIG. 3 is a general schematic diagram illustrating an overview of the system for image-based validation of a target object including a server computing device, client computing device, and cameras connected to a network, according to an embodiment of the subject disclosure.

FIG. 10 is a flowchart of a first method for image-based validation of a target object, according to an embodiment of the subject disclosure.

FIG. 11 is a flowchart of a second method for image-based validation of a target object, according to an embodiment of the subject disclosure.

DETAILED DESCRIPTION

Figure 1:
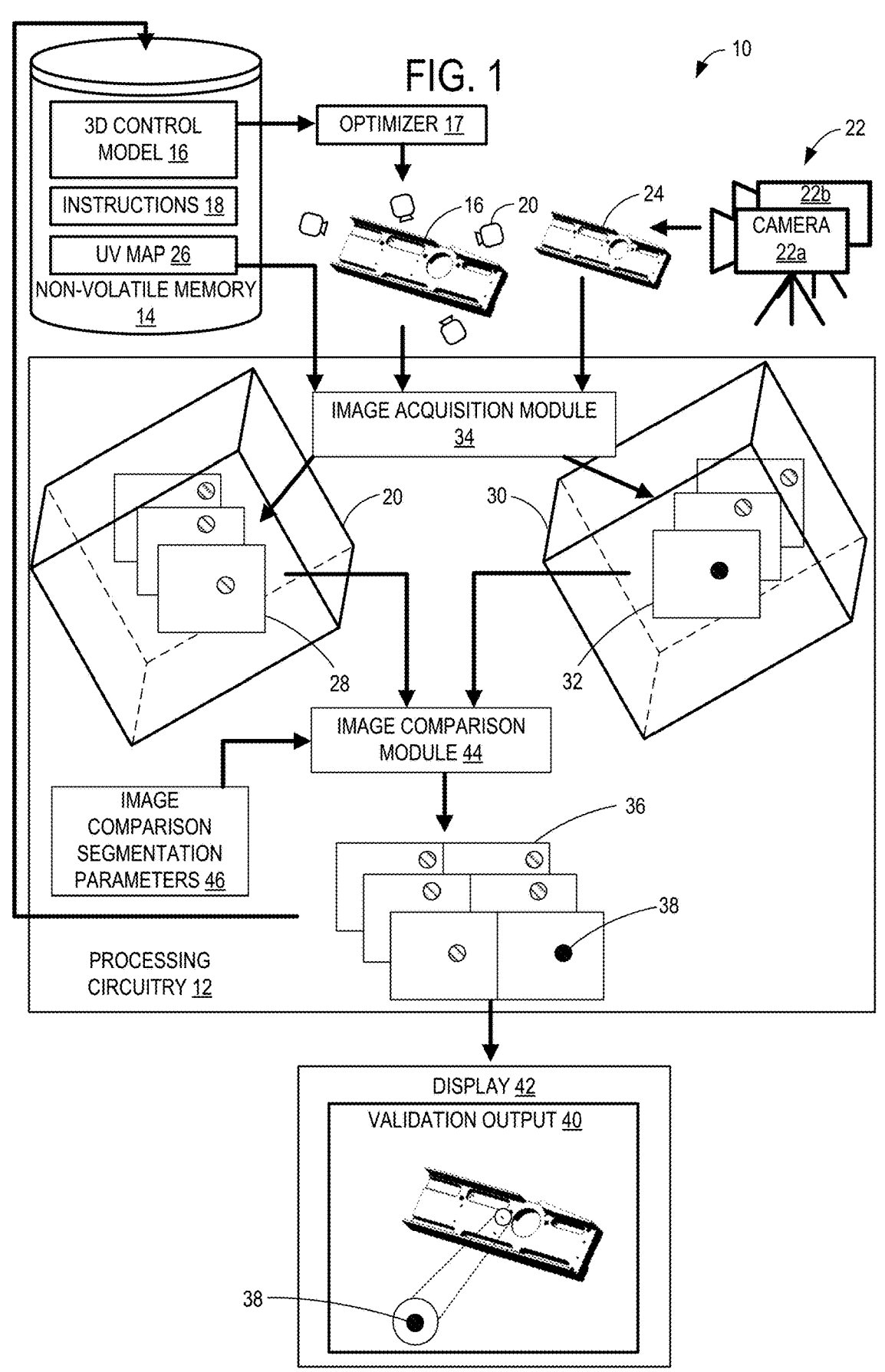
FIG. 1 is a general schematic diagram illustrating an overview of the system for image-based validation of a target object, according to an embodiment of the subject disclosure.
Figure 2:
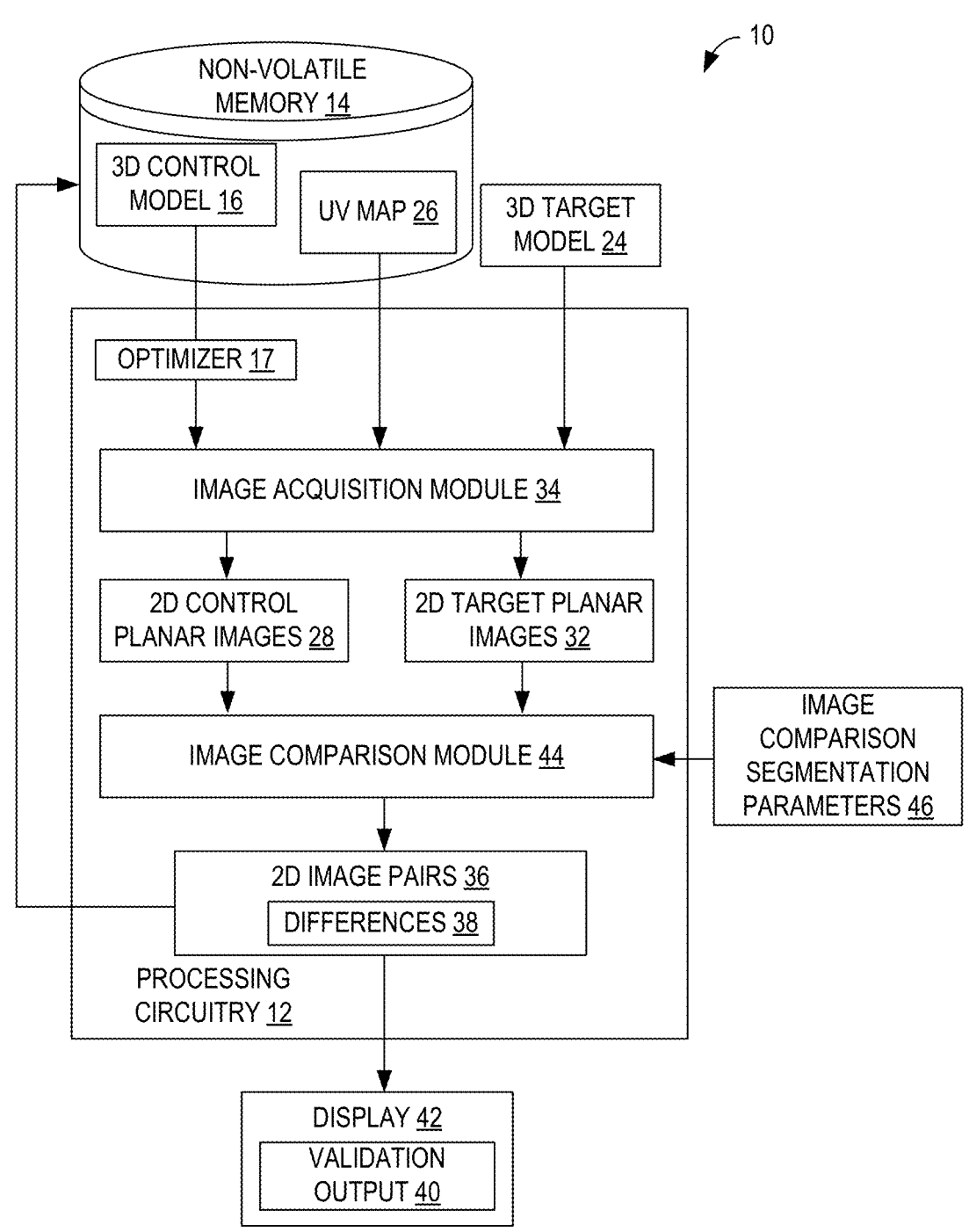
FIG. 2 is a general schematic diagram illustrating an overview of inputs and outputs for the processing circuitry of the system for image-based validation of a target object, according to an embodiment of the subject disclosure.

In view of the above issues, as shown in FIGS. 1 and 2, a system 10 for image-based validation of a target object relative to a 3D control model 16 is provided, comprising processing circuitry 12 communicatively coupled to non-volatile memory 14 storing the 3D control model 16 of a control object and instructions 18 that, when executed by the processing circuitry 12, cause the processing circuitry 12 to retrieve, from the non-volatile memory 14, the 3D control model 16 comprising a plurality of components. The processing circuitry 12 identifies, from the 3D control model 16, coordinates for each of the plurality of components. The 3D control model 16 can be that of an aircraft or an aircraft component, for example. The processing circuitry 12 executes an optimizer 17 to determine a plurality of virtual camera locations using a camera placement algorithm configured to compute a set of the plurality of virtual camera locations and perform a multi-view image capture of all the components of the 3D control model 16 at respective coordinates of the plurality of components, then positions a first plurality of virtual cameras 20 at the determined plurality of virtual camera locations.

The processing circuitry 12 captures, by a plurality of real-life cameras 22a, 22b positioned at real-life camera locations respectively corresponding to the plurality of virtual camera locations, a 3D target model 24 of the target object, which can be an aircraft or an aircraft component, for example. However, it will be appreciated that the control object and the target object are not particularly limited to aircraft and aircraft components, and the control object and the target object can be any manufactured part or component. The sizes of the control objects and the target objects are not particularly limited—the control object and the target object can be micron-scale objects in such applications as printed circuit boards or medical devices, or over-sized objects that are too large for physical inspection using conventional segment-by-segment inspection methods under other 3D reconstruction-based visual inspection systems. The 3D control model 16 and the 3D target model 24 can comprise polygons rendered in a cross-platform 3D graphics format, which can allow the 3D control model 16 and the 3D target model 24 to be accessed across multiple graphics platforms.

In this example, a first real-life camera 22a and a second real-life camera 22b are used to capture the 3D target model 24. However, it will be appreciated that the quantity of real-life cameras 22 is not particularly limited, and more than two real-life cameras 22 can be used to capture the 3D target model 24. The real-life cameras 22 can include at least one depth camera, 3D scanner, visual sensors, RGB cameras, thermal cameras, LiDAR cameras, or a combination thereof. The non-volatile memory 14 can further store a UV map 26, onto which the 3D control model 16 and the 3D target model 24 can be projected. The 3D target model 24 and the 3D control model 16 can be 3D point clouds of at least one of visual, thermal imaging, LiDAR, radar, or humidity sensors. The 3D control model 16 serves as a reference image for purposes of automated image comparison to the 3D target model 24.

Using the first plurality of virtual cameras 20, the processing circuitry 12 generates 2D control planar images 28 of the control object based on the 3D control model 16. The processing circuitry 12 receives the 3D target model 24 captured by the plurality of real-life cameras 22. Using a second plurality of virtual cameras 30, the processing circuitry 12 generate 2D target planar images 32 of the target object based on the 3D target model 24, so that the 2D control planar images 28 correspond to the 2D target planar images 32 of the target object. The poses and locations in the 2D target planar images 32 can correspond to those in the 2D control planar images 28. The first plurality of virtual cameras 20 and the second plurality of virtual cameras 30 can take the 2D target planar images 32 and the 2D control planar images 28 as perpendicularly as possible to the surface of the 3D target model 24 and the 3D control model 16, respectively. Images can be taken along an entire surface and an entire curvature of the 3D target model 24 so that as many anomalies can be detected as possible.

The processing circuitry 12 can be configured so that an image acquisition module 34 of the processing circuitry 12 receives, as input, the 3D control model 16, the UV map 26, and the 3D target model 24, generates the 2D target planar images 32 and the 2D control planar images 28, and outputs the 2D target planar images 32 and the 2D control planar images 28.

The processing circuitry 12 generates 2D image pairs 36 pairing the 2D control planar images 28 to the 2D target planar images 32. Comparing the 2D target planar images 32 to the 2D control planar images 28, the 2D image pairs 36 taken of the parts for both the target object and the control object are compared side-by-side. It will be appreciated that comparing the control object and the target object side-by-side and in the same graphical representation eliminates format conflicts and mismatches between 3D graphical systems and models. For each 2D image pair 36, the 2D control planar image 28 and the 2D target planar image 32 are taken in the same pose and at the same location. The processing circuitry 12 detects at least one difference 38 or anomaly between the 2D target planar images 32 and the 2D control planar images 28, identifying the coordinates of the identified difference 38 in both 3D space and the UV space in the UV map 26. The processing circuitry 12 then generate a validation output indicating at least one difference 38, and outputs the validation output 40 accordingly.

The validation output 40 can be an output image comprising a depiction of the target object with the at least one difference 38 indicated or annotated, and causes the output image to be displayed on a display 42. The 2D image pair 36 and detected differences 38, including the coordinates of the identified differences 38 in both 3D space and the UV space in the UV map 26, can be stored in non-volatile memory 14 for later use in various applications, including the training of deep learning models for automatically classifying types of anomalies.

A large body of images showing an identified difference can be used to train a deep learning model to automatically classify the identified difference. For example, thousands of image pairs showing an incorrectly placed component can be used to train a deep learning model to automatically classify the incorrectly placed component. The image pairs can be manually verified and corrected by human operators before training, so that the deep learning model is trained with the correct classes and corresponding images.

The processing circuitry 12 can be configured so that an image comparison module 44 of the processing circuitry 12 receives, as input, the 2D target planar images 32 and the 2D control planar images 28 as 2D image pairs 36, compares the 2D image pairs 36 taken of the parts for both the target object and the control object side-by-side, detects at least one difference 38 between the 2D target planar images 32 and the 2D control planar images 28, generates a validation output 40 accordingly. The image comparison module 44 can accept image comparison segmentation parameters 46 for controlling how the difference 38 is indicated or annotated on the 2D image pairs 36. In this example, the difference 38 is indicated or annotated by a circle.

FIG. 3 is a schematic diagram of the system 10 for image-based validation of a target object comprising a server computing device 48 which includes processing circuitry 12, which can be communicatively coupled to a network 54. The server computing device 48 includes a network interface 50 to affect the communicative coupling to the network 54, and, through the network 54, a client computing device 56 and a plurality of real-life cameras 22. The client computing device 56 comprises a display 42 which is configured to display a validation output 40. Network interface 50 can include a physical network interface, such as a network adapter. The server computing device 48 can be a special-purpose computer, adapted for reliability and high-bandwidth communications. Thus, the system 10 can be embodied in a cluster of individual hardware server computers, for example. The processing circuitry 12 can be multi-core processors suitable for handling large amounts of information. The processing circuitry 12 is communicatively coupled to non-volatile memory 14 storing a 3D control model 16, UV map 26, and instructions 18, which can be executed by the processing circuitry 12 to effectuate the techniques disclosed herein on concert with the client computing device 56 as shown and described below. The non-volatile memory 14 can be in a Redundant Array of Inexpensive Disk drives (RAID) configuration for added reliability. The processing circuitry 12 can also be communicatively coupled to graphical co-processors (GPU) 52. Graphical co-processors can expedite the technique disclosed herein by performing operations in parallel.

Figure 4:
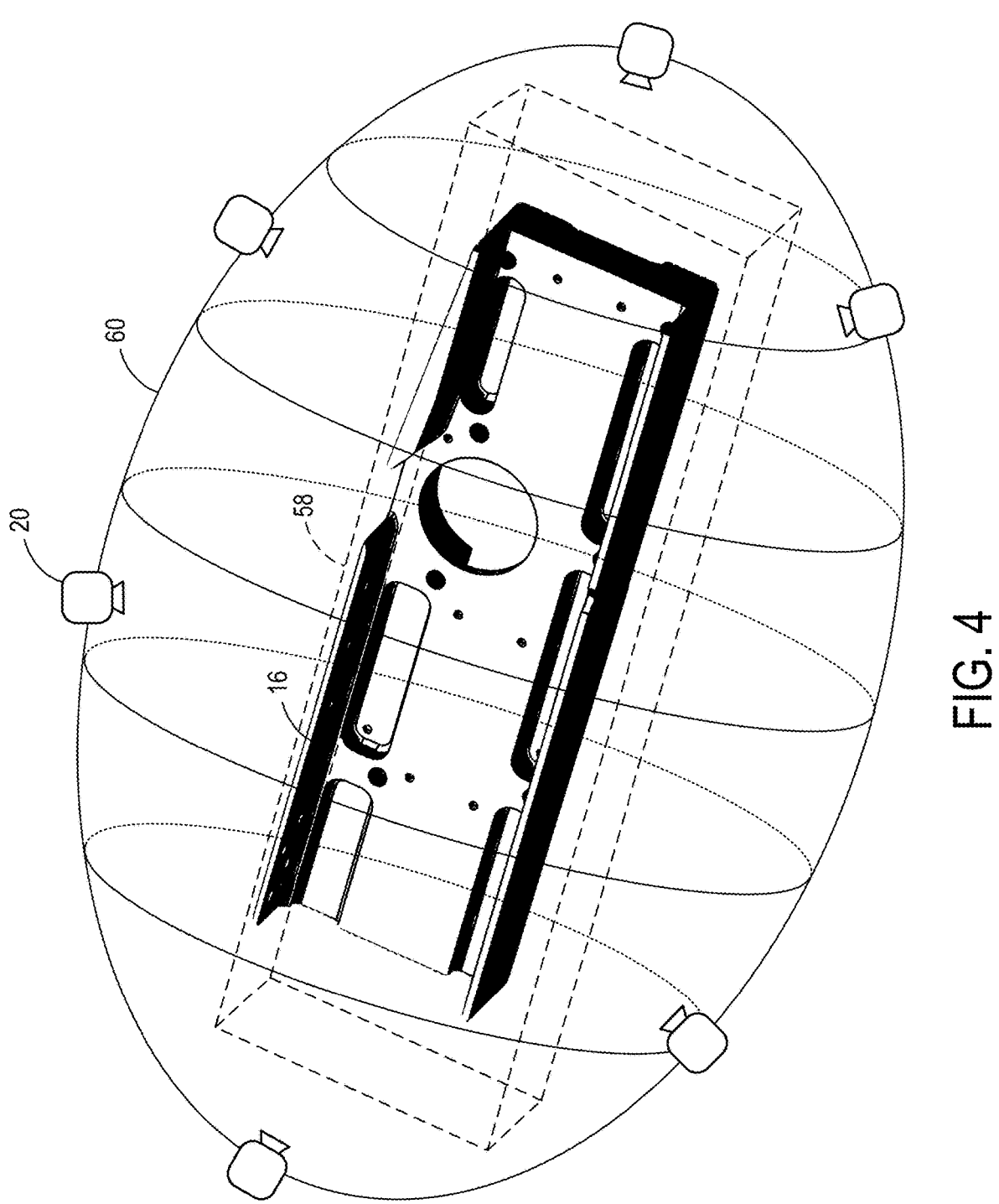
FIG. 4 is an illustration of the determination of the plurality of virtual camera locations to position the virtual cameras and perform a multi-view image capture of all the components of a 3D control model, according to an embodiment of the subject disclosure.

Referring to FIG. 4, the determination of the plurality of virtual camera locations to position the virtual cameras 20 and perform a multi-view image capture of all the components of the 3D control model 16 is depicted. The 3D control model 16 includes a 3D bill of materials which is configured to specify an orientation and a location for each component included in the 3D control model 16. The location for each component can be indicated as 3D Cartesian coordinates in UV space, and the orientation for each component can be indicated as IJK polar coordinates. Accordingly, from the 3D control model 16 of the target object, location and orientation coordinates for each component of the 3D control model 16 can be identified.

In the context of 3D imaging and processing, a 3D bill of materials refers to a structured and comprehensive list or database that enumerates all the individual components, elements, or sub-assemblies inherent in a given 3D model. Each item or element within the 3D bill of materials is uniquely identified and can include attributes such as names and descriptors, spatial coordinates, polar coordinates, material properties, relational data, and other metadata.

An optimizer determining the plurality of virtual camera locations can initially define the virtual camera parameters, which can include Field of View (FOV) and aspect ratio. The optimizer can compute a bounding box 58 that encloses the 3D control model 16, and also compute a bounding sphere 60 which encloses the bounding box 58. The plurality of virtual camera locations can be positioned on the surface of the bounding sphere 60.

The optimizer can apply a camera placement algorithm to determine a minimum number of virtual camera locations and perform a multi-view image capture of all the components of the 3D control model 16 at respective coordinates of the plurality of components. The minimum number of virtual cameras 20 can be determined by grouping sets of the components relative to a predetermined plane that is associated with a surface of the 3D control model 16 (such as by grouping sets of components/holes within a given surface of a part defined in the 3D control model, for example, relative to a predetermined plane that is associated with the given surface of the 3D control model 16). The minimum number of virtual cameras 20 can also be determined by grouping the sets of the components into a plurality of common surfaces of the 3D control model 16 (relative to which respective imaging of each of the plurality of common surfaces would acquire all of the components associated with a part defined in the 3D control model).

Figure 5:
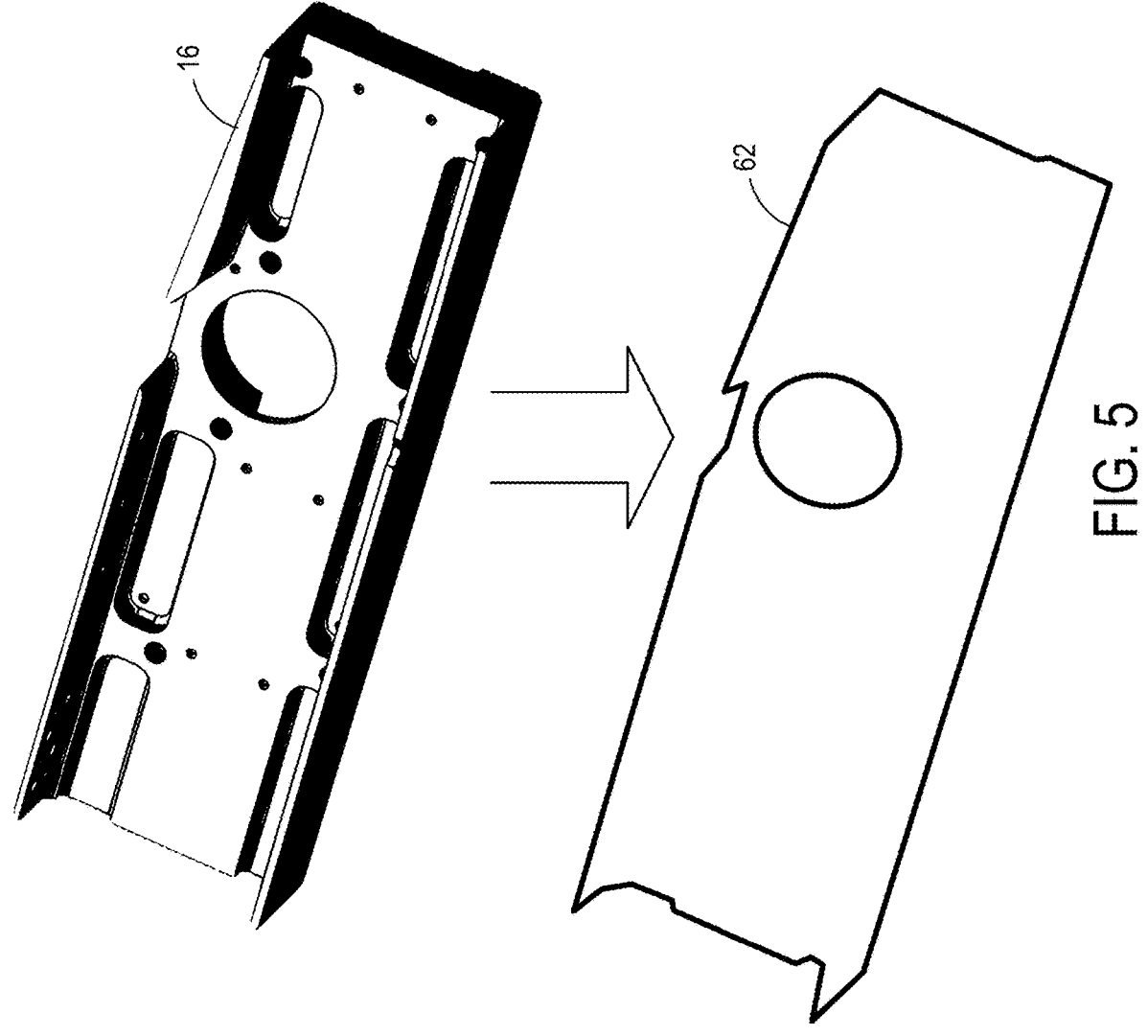
FIG. 5 is an illustration of the creation of templates associated with views from each virtual camera location, according to an embodiment of the subject disclosure.

Referring to FIG. 5, the creation of templates 62 associated with views from each virtual camera location is depicted. For each of the virtual camera locations determined by the optimizer of FIG. 4 executing the camera placement algorithm, a virtual image of the 3D control model 16 is generated. Templates 62 outlining the shapes of the 3D control model 16 as viewed from each of the virtual camera locations determined by the optimizer are generated. The templates 62 are configured to be used to find acquired images of the target object which were taken from similar views as those of the virtual camera locations determined by the optimizer.

The camera placement algorithm can position virtual camera locations around the bounding sphere to ensure that all the components of the 3D control model 16 can be captured by the virtual cameras. Constraints such as overlapping views, minimal occlusion, and optimal resolution can be considered by the camera placement algorithm. Ergonomic constraints can also be considered so that the virtual camera locations correspond to real-life camera locations, defining criteria such as acceptable distance ranges from the 3D control model 16, for example. Angular constraints can be considered to position the virtual camera locations at positions in 3D space facing as many of the components as possible in a normal direction from the components.

The templates 62 can be generated by employing a rendering algorithm which ensures that each generated template 62 represents a unique view of the 3D control model 16. Rendering techniques can include edge detection to capture the contours and dimensions of the 3D control model 16 as viewed from each virtual camera location. Each template 62 can then be stored in a database, categorized by its associated virtual camera location, to facilitate easy retrieval at later stages.

Additionally, metadata can be associated with each template 62 to capture key attributes such as the virtual camera locations, and the position and orientation of the virtual camera at each virtual camera location. This metadata can serve as supplementary information which can be utilized to fine-tune the camera placement algorithm or provide guidance to users on how to acquire images of the target object using real-life cameras. The real-life camera locations respectively corresponding to the plurality of virtual camera locations can be determined in real 3D space using Barycentric coordinates to help guide the placement of real-life cameras to capture the desired views of the target object. Thus, the plurality of virtual camera locations can be stored in the templates representing the 3D control model 16.

Figure 6:
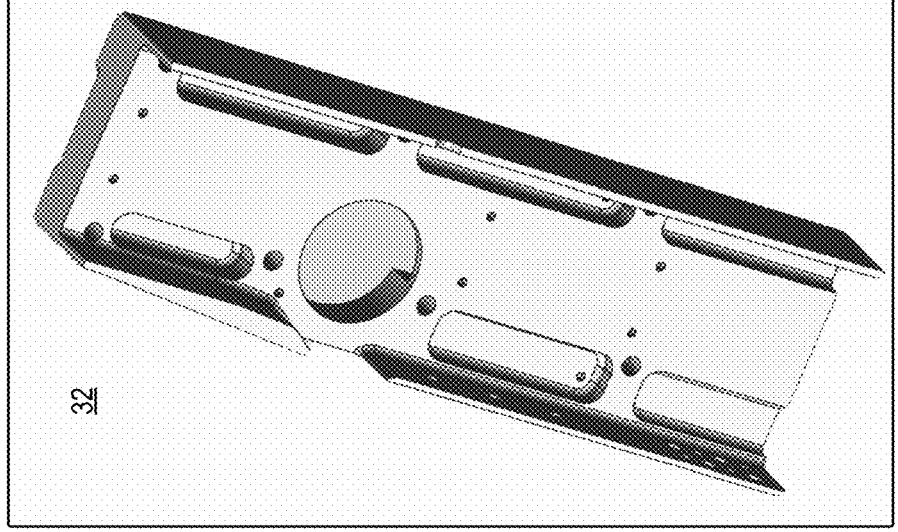
FIG. 6 is an illustration of the acquisition of images in real-life, the mapping of the target object in the acquired images, and the mapping of each acquired image to the corresponding template of the acquired image, according to an embodiment of the subject disclosure.

Referring to FIG. 6, the acquisition of images 32 in real-life, the mapping of the target object in the acquired images 32, and the mapping of each acquired image 32 to the corresponding template 62 of the acquired image 32 are illustrated.

Cameras can be positioned in real-world locations, which can be selected to correspond closely with virtual camera locations previously determined by the optimizer. These real-world cameras capture images by performing template-based multi-view imaging of a target object that is based on the 3D control model.

After acquiring the images 32, a masking technique is applied to isolate the target object from its background in each acquired image 32. This allows for precise mapping of the features of the target object. Subsequently, each masked image is matched to a pre-generated template 62 from a template database. Each corresponding template 62 represents a view of the 3D control model that closely approximates the perspective from which the real-life acquired image 32 was captured.

Once the appropriate template 62 is identified for each acquired image 32, a mapping process begins. The system retrieves the locations and orientations of the components of the 3D control model 16 as represented in the selected template. This information serves as a reference point for comparison. The system then analyzes the acquired images 32, identifying the locations and orientations of the actual components of the target object that was manufactured based on the 3D control model 16.

Figure 7:
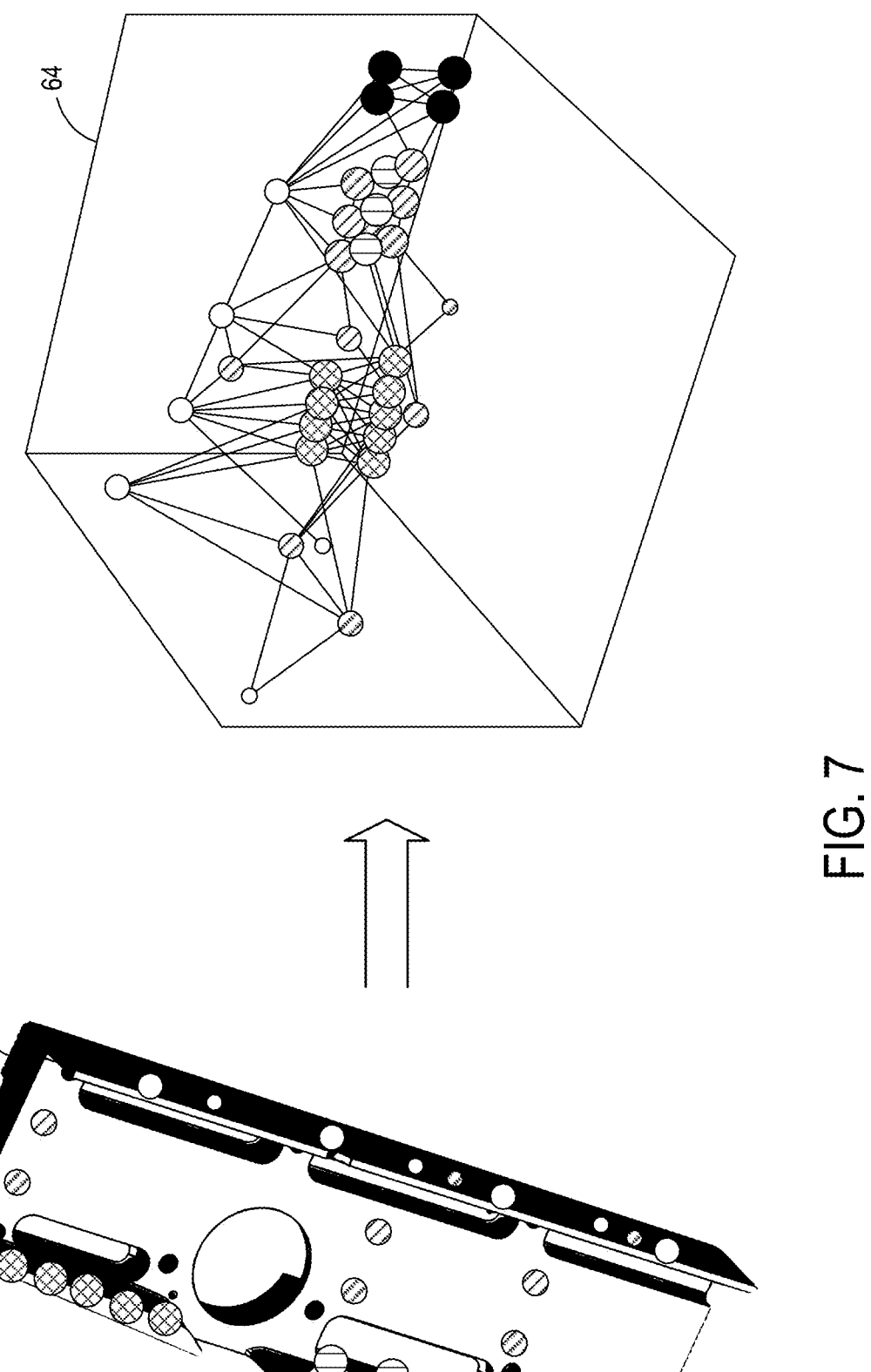
FIG. 7 is an illustration of the generation of a 3D component graph that represents all the components of the 3D control model, according to an embodiment of the subject disclosure.

Referring to FIG. 7, the illustration outlines the generation of a 3D component graph 64 that represents all the components of the 3D control model 16. In this visual representation, each component of the 3D control model 16 is designated by a multi-colored dot. The components of the 3D control model 16 are then mapped onto a 3D Cartesian coordinate system, forming the 3D component graph 64, which elucidates the spatial relationships among the various components of the 3D control model 16, accurately portraying their relative positions in three-dimensional space. Each component in the 3D component graph 64 can be tagged with metadata, which can indicate but is not limited to component identification numbers, dimensions, and material properties.

Figure 8:
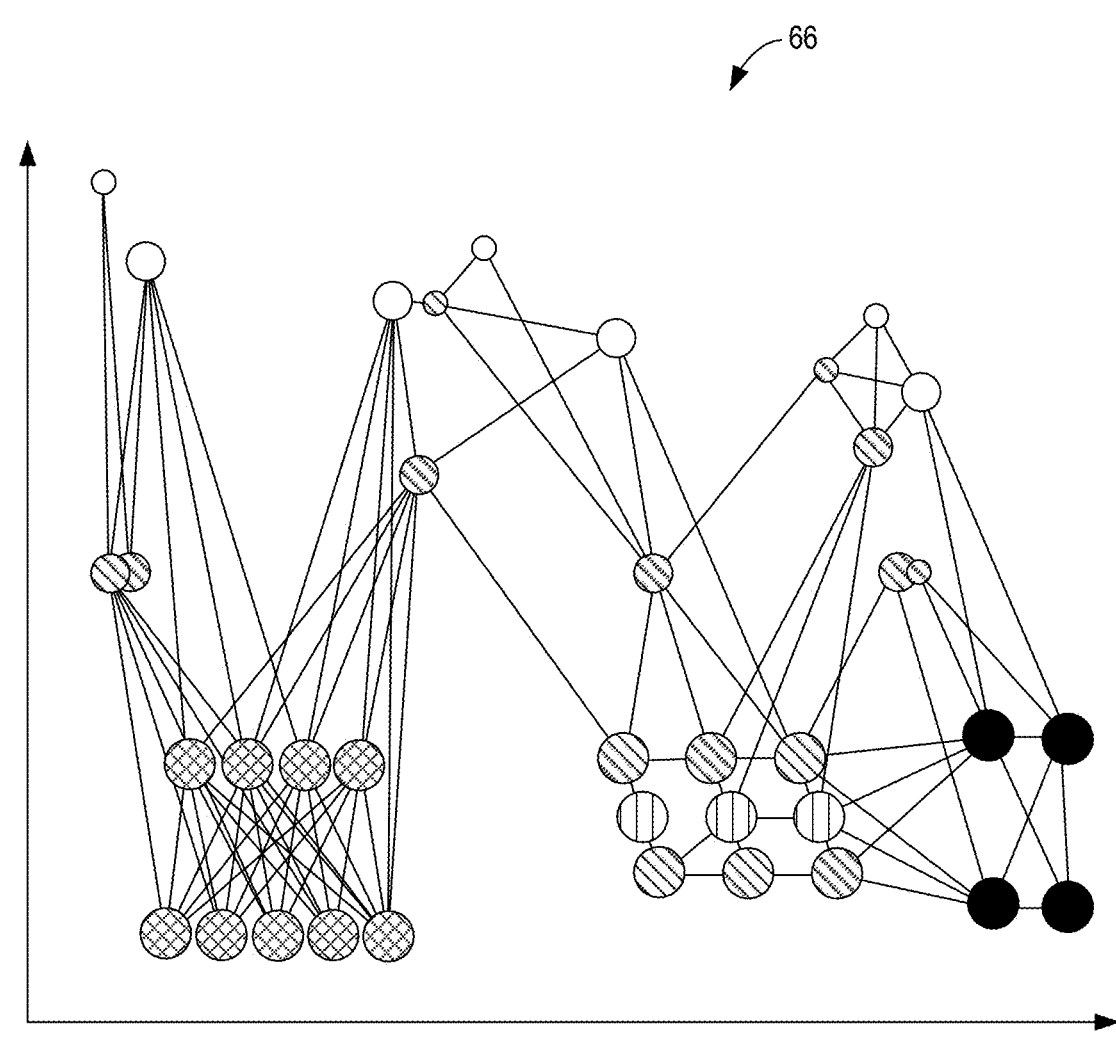
FIG. 8 is an illustration of the generation of 2D component graphs representing all components of the 3D component model, according to an embodiment of the subject disclosure.

Referring to FIG. 8, the generation of 2D component graphs 66 representing all components of the 3D control model is illustrated. These 2D component graphs 66 are derived from the previously described 3D component graph through the application of a flattening algorithm. The algorithm utilizes the pre-generated templates as a reference to ensure that the spatial relationships among the components are accurately translated into the 2D representation.

The flattening algorithm works by projecting the components in the 3D component graph onto a two-dimensional plane. Various projection techniques can be employed, such as orthographic or perspective projections. Once projected, the 2D component graphs 66 are generated, maintaining as much of the original spatial information as possible within the constraints of the two-dimensional format.

Following the generation of the 2D component graphs 66, these graphs 66 are employed to facilitate the mapping of the components of the 3D control model onto the corresponding templates. Specifically, each 2D component graph 66 is aligned with the template that matches the perspective from which the real-life image was acquired. This alignment ensures that the components of the 3D control model are accurately positioned within the frame of reference provided by the corresponding template.

Components of the 2D component graph 66 of the 3D control model are anchored onto a template corresponding to the acquired 2D target planar image, thereby generating a localized 2D control planar image so as to localize each component from the 2D component graph 66 to 3D geometry. Likewise, components of the 3D target model are anchored to components of the 2D target planar images, so that components of the 3D control model can be easily compared with the components of the 3D target model to identify similarities and differences.

Figure 9:
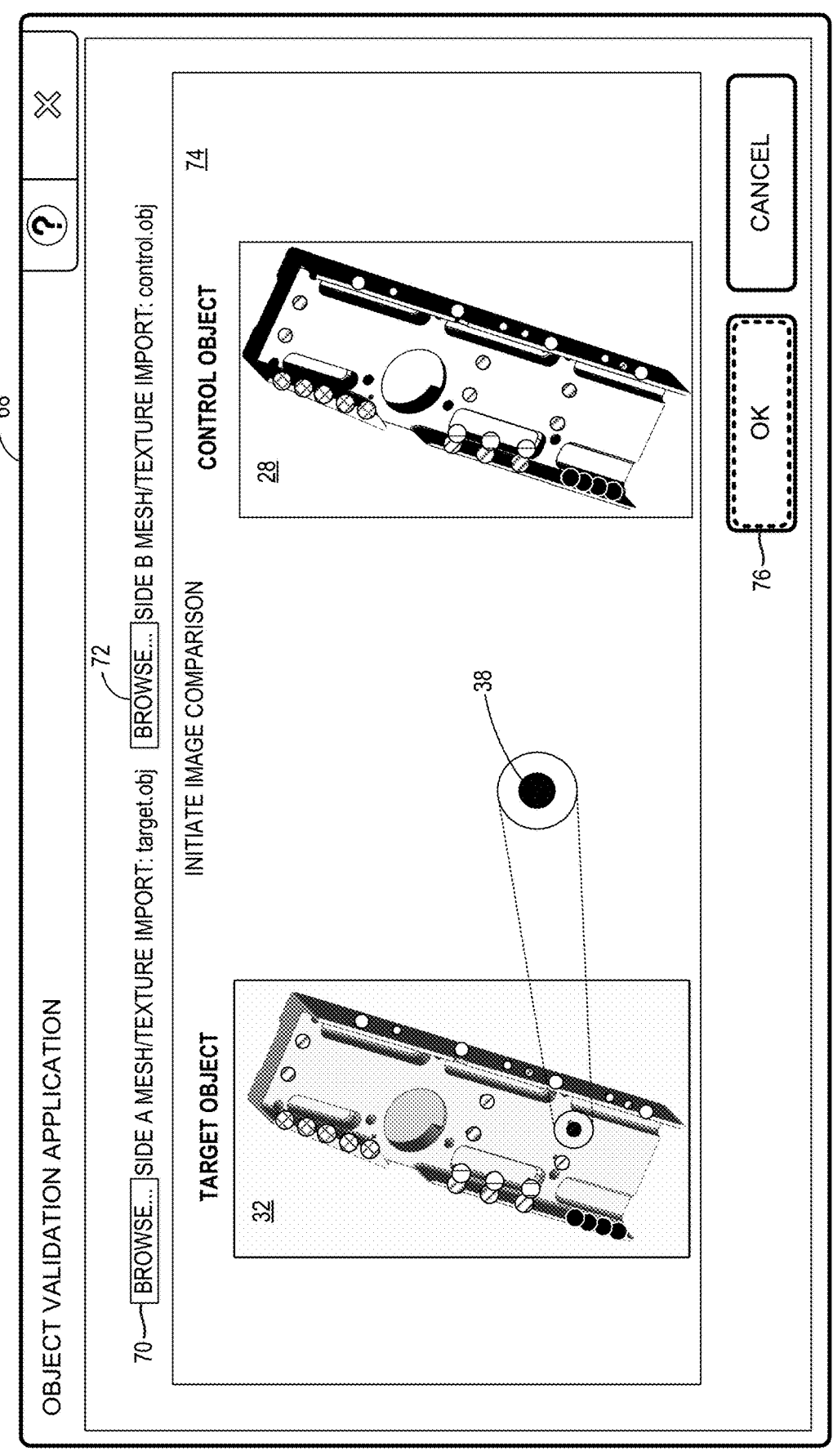
FIG. 9 is an illustration of a user interface for the image-based validation of a target object relative to a 3D control model, according to an embodiment of the subject disclosure.

Referring to FIG. 9, the comparison of components identified in the acquired image 32 of the target object to components in the localized 2D control planar image 28 is depicted in an illustration of a user interface 68 for the image-based validation of a target object relative to a 3D control model.

A first browse button 70 can be provided to select a 3D target object, and a second browse button 72 can be provided to select a 3D control object. An image capture window 74 can display the 3D target object and the 3D control object. Upon clicking the OK button 76, the image acquisition module can proceed to receive the 3D target object and the 3D control object and generate the 2D target planer images 32 and 2D control planar images 28 accordingly. The 2D control planar image 28 and the corresponding 2D target planar image 32 are compared side-by-side. At least one difference 38 or anomaly is detected between the 2D target planar images 32 and the 2D control planar images 28, identifying the coordinates of the identified difference 38 in both 3D space and the UV space in the UV map. A validation output is subsequently generated and outputted based on the comparison.

FIG. 10 shows a first exemplary method 100 for image-based validation of a target object according to an example of the present disclosure. The following description of the first method 100 is provided with reference to the software and hardware components described above and shown in FIGS. 1 through 9. It will be appreciated that the first method 100 also can be performed in other contexts using other suitable hardware and software components.

At step 102, the 3D control model comprising a plurality of components is retrieved from the non-volatile memory. At step 104, coordinates for each of the plurality of components are identified from the 3D control model. At step 106, a plurality of virtual camera locations are determined using a camera placement algorithm configured to compute a set of the plurality of virtual camera locations and perform a multi-view image capture of all the components of the 3D control model at respective coordinates of the plurality of components. At step 108, virtual cameras are positioned at the determined plurality of virtual camera locations.

At step 110, a 3D target model of the target object is captured by a plurality of real-life cameras positioned at real-life camera locations respectively corresponding to the plurality of virtual camera locations. At step 112, the 3D target model captured by the plurality of real-life cameras is received. At step 114, 2D target planar images of the target object are generated based on the 3D target model. At step 116, 2D control planar images of the control object are generated based on the 3D control model. The 2D control planar images correspond to the 2D target planar images of the target object.

At step 118, at least one difference is detected between the 2D target planar images and the 2D control planar images. At step 120, a validation output is generated indicating the at least one difference. At step 122, the validation output is outputted.

FIG. 11 shows a second exemplary method 200 for image-based validation of a target object according to an example of the present disclosure. The following description of the second method 200 is provided with reference to the software and hardware components described above and shown in FIGS. 1 through 9. It will be appreciated that the second method 200 also can be performed in other contexts using other suitable hardware and software components.

At step 202, coordinates for each component of a 3D control model of a target object are identified. At step 204, an optimizer is used to determine a minimum number of virtual camera locations and perform a multi-view image capture of all the components of the 3D control model. At step 206, templates associated with views from each virtual camera location are generated.

At step 208, camera images are acquired by performing template-based multi-view imaging of a target object, using real-life cameras positioned at real-life camera locations respectively corresponding to the virtual camera locations. At step 210, masking is performed, and the target object is mapped in each of the acquired images to corresponding templates of the acquired images.

At step 212, each acquired image is mapped to the corresponding template of the acquired image. At step 214, a 3D component graph of all components of the 3D control model is generated using the 3D control model. At step 216, 2D component graphs representing all components of the 3D control model are generated using the 3D component graph.

At step 218, components from the 2D component graphs are anchored onto templates corresponding to the acquired images, thereby generating localized images and localizing each component from the 2D component graphs to 3D geometry.

At step 220, a comparison is performed of components identified in the acquired images of the target object with components in the localized images. At step 222, a validation output is generated and outputted based on the comparison.

Figure 12:
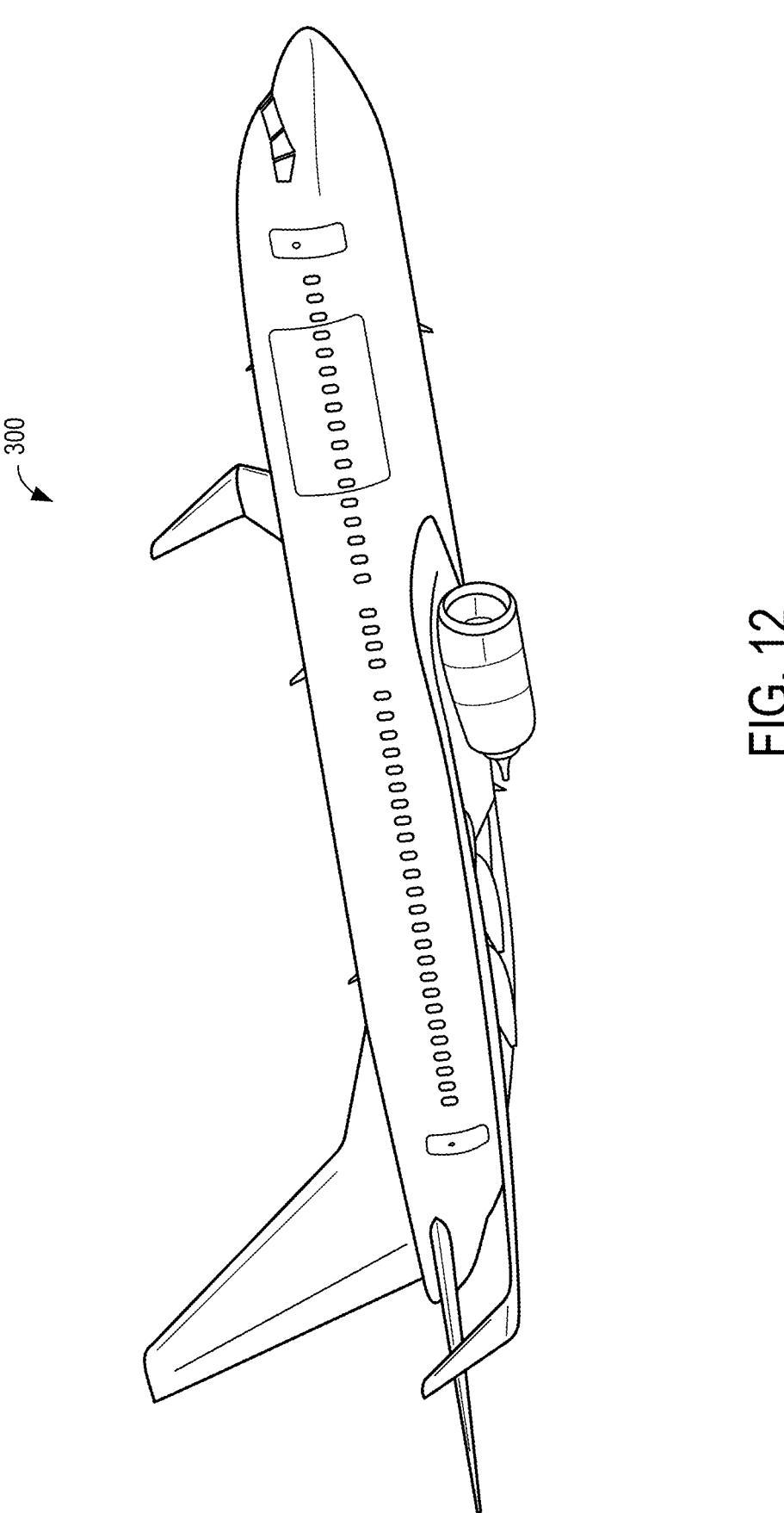
FIG. 12 is an illustration of an aircraft that can be inspected by the system for image-based validation, according to an embodiment of the subject disclosure.

FIG. 12 is an image of an aircraft 300 according to some embodiments. It will be appreciated that the aircraft 300 or the components thereof can be the target object or the control object of the 3D target image or the 3D control image, respectively, that are inspected in accordance with the system 10 and methods 100 and 200 of the subject disclosure.

The systems and processes described herein have the potential benefit of providing a precise means of comparing a 3D control model with a target object that was manufactured based on the 3D control model. Any deviations or inconsistencies between the 3D control model and the target object can be pinpointed, not just in terms of overall shape, but also in the specific positioning and orientation of individual components. As a result, rigorous quality control assessments can be performed, ensuring the fidelity of the manufactured target object to its original 3D design.

Figure 13:
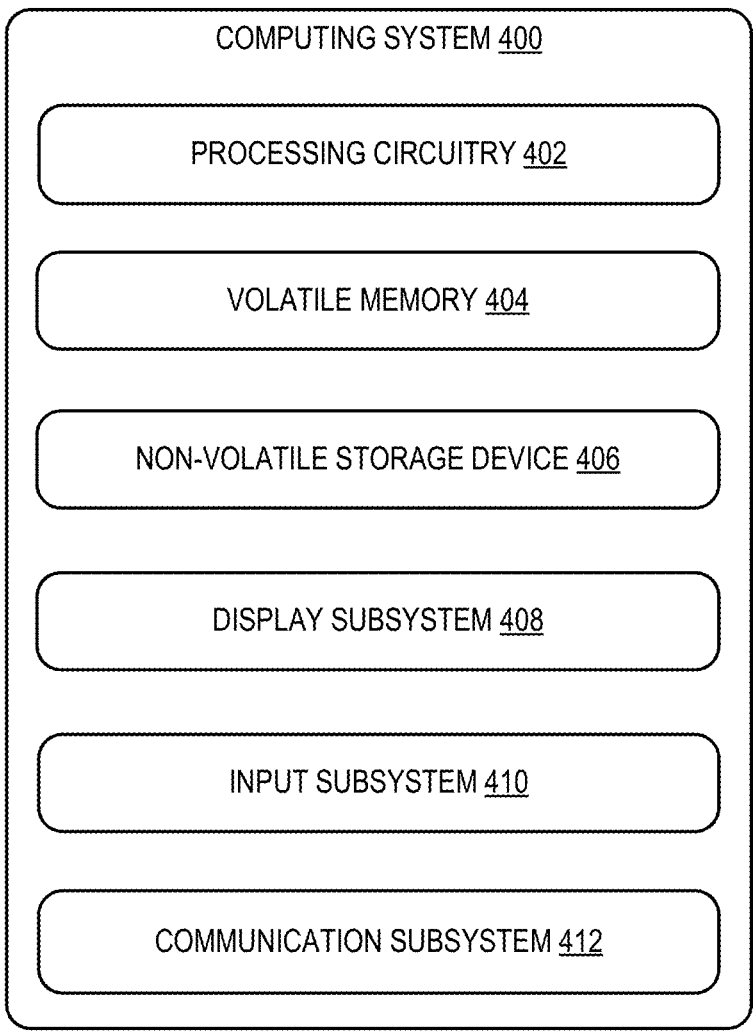
FIG. 13 is a schematic diagram illustrating an exemplary computing system that can be used to implement the system for image-based validation of target objects of FIGS. 1-9.

FIG. 13 schematically shows a non-limiting embodiment of a computing system 400 that can enact one or more of the methods and processes described above. Computing system 400 is shown in simplified form. Computing system 400 can embody the computing system 10 described above and illustrated in FIGS. 1-3. Components of computing system 400 can be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 400 includes processing circuitry 402, volatile memory 404, and a non-volatile storage device 406. Computing system 400 can optionally include a display subsystem 408, input subsystem 410, communication subsystem 412, and/or other components not shown in FIG. 13.

Processing circuitry 402 typically includes one or more logic processors, which are physical devices configured to execute instructions. For example, the logic processors can be configured to execute instructions that are part of one or more applications, programs, routines, libraries, objects, components, data structures, or other logical constructs. Such instructions can be implemented to perform a task, implement a data type, transform the state of one or more components, achieve a technical effect, or otherwise arrive at a desired result.

The logic processor can include one or more physical processors configured to execute software instructions. Additionally or alternatively, the logic processor can include one or more hardware logic circuits or firmware devices configured to execute hardware-implemented logic or firmware instructions. Processors of the processing circuitry 402 can be single-core or multi-core, and the instructions executed thereon can be configured for sequential, parallel, and/or distributed processing. Individual components of the processing circuitry optionally can be distributed among two or more separate devices, which can be remotely located and/or configured for coordinated processing. For example, aspects of the computing system disclosed herein can be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 402.

Non-volatile storage device 406 includes one or more physical devices configured to hold instructions executable by the processing circuitry to implement the methods and processes described herein. When such methods and processes are implemented, the state of non-volatile storage device 406 can be transformed—e.g., to hold different data.

Non-volatile storage device 406 can include physical devices that are removable and/or built in. Non-volatile storage device 406 can include optical memory, semiconductor memory, and/or magnetic memory, or other mass storage device technology. Non-volatile storage device 406 can include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 can include physical devices that include random access memory. Volatile memory 404 is typically utilized by processing circuitry 402 to temporarily store information during processing of software instructions. It will be appreciated that volatile memory 404 typically does not continue to store instructions when power is cut to the volatile memory 404.

Aspects of processing circuitry 402, volatile memory 404, and non-volatile storage device 406 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" can be used to describe an aspect of computing system 400 typically implemented in software by a processor to perform a particular function using portions of volatile memory, which function involves transformative processing that specially configures the processor to perform the function. Thus, a module, program, or engine can be instantiated via processing circuitry 402 executing instructions held by non-volatile storage device 406, using portions of volatile memory 404. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

When included, display subsystem 408 can be used to present a visual representation of data held by non-volatile storage device 406. The visual representation can take the form of a graphical user interface (GUI). As the herein described methods and processes change the data held by the non-volatile storage device, and thus transform the state of the non-volatile storage device, the state of display subsystem 408 can likewise be transformed to visually represent changes in the underlying data. Display subsystem 408 can include one or more display devices utilizing virtually any type of technology. Such display devices can be combined with processing circuitry 402, volatile memory 404, and/or non-volatile storage device 406 in a shared enclosure, or such display devices can be peripheral display devices.

When included, input subsystem 410 can comprise or interface with one or more user-input devices such as a keyboard, mouse, touch screen, camera, or microphone.

When included, communication subsystem 412 can be configured to communicatively couple various computing devices described herein with each other, and with other devices. Communication subsystem 412 can include wired and/or wireless communication devices compatible with one or more different communication protocols. As non-limiting examples, the communication subsystem can be configured for communication via a wired or wireless local- or wide-area network, broadband cellular network, etc. In some embodiments, the communication subsystem can allow computing system 400 to send and/or receive messages to and/or from other devices via a network such as the Internet.

Further, the disclosure comprises configurations according to the following clauses.

Clause 1. A system for image-based validation of a target object relative to a 3D control model, the system comprising: processing circuitry, communicatively coupled to non-volatile memory storing the 3D control model of a control object and instructions that, when executed by the processing circuitry, cause the processing circuitry to: retrieve from the non-volatile memory the 3D control model comprising a plurality of components; identify, from the 3D control model, coordinates for each of the plurality of components; determine a plurality of virtual camera locations using a camera placement algorithm configured to compute a set of the plurality of virtual camera locations that enable a multi-view image capture of all the components of the 3D control model at respective coordinates of the plurality of components; position virtual cameras at the determined plurality of virtual camera locations; capture, by a plurality of real-life cameras positioned at real-life camera locations respectively corresponding to the plurality of virtual camera locations, a 3D target model of the target object; receive the 3D target model captured by the plurality of real-life cameras; generate 2D target planar images of the target object based on the 3D target model; generate 2D control planar images of the control object based on the 3D control model, the 2D control planar images corresponding to the 2D target planar images of the target object; detect at least one difference between the 2D target planar images and the 2D control planar images; generate a validation output indicating the at least one difference; and output the validation output.

Clause 2. The system of clause 1, wherein, according to the camera placement algorithm, the plurality of virtual camera locations to position the virtual cameras is determined by determining a minimum number of virtual camera locations which enables the multi-view image capture of all the components of the 3D control model at the respective coordinates of the plurality of components.

Clause 3. The system of clause 2, wherein the minimum number of virtual cameras is determined by grouping sets of the components relative to a predetermined plane that is associated with a surface of the 3D control model.

Clause 4. The system of clause 3, wherein the minimum number of virtual cameras is determined by grouping the sets of the components into a plurality of common surfaces of the 3D control model.

Clause 5. The system of clause 3, wherein the predetermined plane is normal to the surface of the 3D control model.

Clause 6. The system of clause 2, wherein the processing circuitry positions the virtual cameras at the determined plurality of virtual camera locations in UV space; and the processing circuitry determines the real-life camera locations respectively corresponding to the plurality of virtual camera locations in 3D space using Barycentric coordinates.

Clause 7. The system of clause 1, wherein the plurality of virtual camera locations are stored as a template representing the 3D control model.

Clause 8. The system of clause 1, wherein components of the 2D control planar images are anchored to the plurality of components of the 3D control model; and components of the 2D target planar images are anchored to the plurality of components of the 3D target model.

Clause 9. The system of clause 1, wherein the coordinates for each of the plurality of components of the 3D control model are identified based on a bill of materials of the 3D control model.

Clause 10. The system of clause 1, wherein the validation output is an output image comprising a depiction of the target object with the at least one difference indicated.

Clause 11. A method for image-based validation of a target object relative to a 3D control model, the method comprising: retrieving from non-volatile memory the 3D control model comprising a plurality of components; identifying, from the 3D control model, coordinates for each of the plurality of components; determining a plurality of virtual camera locations using a camera placement algorithm configured to compute a set of the plurality of virtual camera locations that enable a multi-view image capture of all the components of the 3D control model at respective coordinates of the plurality of components; positioning virtual cameras at the determined plurality of virtual camera locations; capturing, by a plurality of real-life cameras positioned at real-life camera locations respectively corresponding to the plurality of virtual camera locations, a 3D target model of the target object; receiving the 3D target model captured by the plurality of real-life cameras; generating 2D target planar images of the target object based on the 3D target model; generating 2D control planar images of a control object based on the 3D control model, the 2D control planar images corresponding to the 2D target planar images of the target object; detecting at least one difference between the 2D target planar images and the 2D control planar images; generating a validation output indicating the at least one difference; and outputting the validation output.

Clause 12. The method of clause 11, wherein, according to the camera placement algorithm, the plurality of virtual camera locations to position the virtual cameras is determined by determining a minimum number of virtual camera locations which enables the multi-view image capture of all the components of the 3D control model at the respective coordinates of the plurality of components.

Clause 13. The method of clause 12, wherein the minimum number of virtual cameras is determined by grouping sets of the components relative to a predetermined plane that is associated with a surface of the 3D control model.

Clause 14. The method of clause 13, wherein the minimum number of virtual cameras is determined by grouping the sets of the components into a plurality of common surfaces of the 3D control model.

Clause 15. The method of clause 13, wherein the predetermined plane is normal to the surface of the 3D control model.

Clause 16. The method of clause 12, wherein the virtual cameras are positioned at the determined plurality of virtual camera locations in UV space; and the real-life camera locations respectively corresponding to the plurality of virtual camera locations are determined in 3D space using Barycentric coordinates.

Clause 17. The method of clause 11, wherein the plurality of virtual camera locations are stored as a template representing the 3D control model.

Clause 18. The method of clause 11, wherein components of the 2D control planar images are anchored to the plurality of components of the 3D control model; and components of the 2D target planar images are anchored to the plurality of components of the 3D target model.

Clause 19. The method of clause 11, wherein the coordinates for each of the plurality of components of the 3D control model are identified based on a bill of materials of the 3D control model.

Clause 20. A system for image-based validation of a target object relative to a 3D control model, the system comprising: non-volatile memory storing instructions and the 3D control model depicting at least a portion of a control aircraft; a plurality of cameras disposed to capture a 3D target model of a portion of a target aircraft corresponding to the portion of the control aircraft; processing circuitry, communicatively coupled to non-volatile memory storing and the plurality of cameras, that executes the instructions to cause the processing circuitry to: retrieve from the non-volatile memory the 3D control model comprising a plurality of components; identify, from the 3D control model of a control object, coordinates in UV space for each of the plurality of components; determine a plurality of virtual camera locations using a camera placement algorithm configured to compute a set of the plurality of virtual camera locations that enable a multi-view image capture of all the components of the 3D control model at respective coordinates of the plurality of components; position virtual cameras at the determined plurality of virtual camera locations; determine a plurality of real-life camera locations respectively corresponding to the plurality of virtual camera locations in 3D space using Barycentric coordinates; capture, by a plurality of real-life cameras positioned at the plurality of real-life camera locations respectively corresponding to the plurality of virtual camera locations, the 3D target model of the target object; receive the 3D target model captured by the plurality of real-life cameras; generate 2D target planar images of the target object based on the 3D target model; generate 2D control planar images of the control object based on the 3D control model, the 2D control planar images corresponding to the 2D target planar images of the target object; detect at least one difference between the 2D target planar images and the 2D control planar images; generate a validation output indicating the at least one difference; and output the validation output.

The invention claimed is:

1. A system for image-based validation of a target object relative to a 3D control model, the system comprising:

processing circuitry, communicatively coupled to non-volatile memory storing the 3D control model of a control object and instructions that, when executed by the processing circuitry, cause the processing circuitry to:

retrieve from the non-volatile memory the 3D control model specifying orientations and coordinates of a plurality of components in a bill of materials;

identify, from the 3D control model, the orientations and the coordinates for each of the plurality of components;

determine a plurality of virtual camera locations using a camera placement algorithm configured to compute a set of the plurality of virtual camera locations that enable a multi-view image capture of all the components of the 3D control model at respective orientations and coordinates of the plurality of components;

position virtual cameras at the determined plurality of virtual camera locations;

capture, by a plurality of real-life cameras positioned at real-life camera locations respectively corresponding to the plurality of virtual camera locations, a 3D target model of the target object;

receive the 3D target model captured by the plurality of real-life cameras;

generate 2D target planar images of the target object based on the 3D target model;

generate 2D control planar images of the control object based on the 3D control model, the 2D control planar images corresponding to the 2D target planar images of the target object;

detect at least one difference between the 2D target planar images and the 2D control planar images;

generate a validation output indicating the at least one difference; and output the validation output, wherein according to the camera placement algorithm, the plurality of virtual camera locations to position the virtual cameras is determined by determining a minimum number of virtual camera locations which enables the multi-view image capture of all the components of the 3D control model at the respective coordinates of the plurality of components; and the minimum number of virtual camera locations is determined by grouping sets of the components relative to a predetermined plane that is associated with a surface of a part defined in the bill of materials of the 3D control model.

2. The system of claim 1, wherein the minimum number of virtual camera locations is determined by grouping the sets of the components into a plurality of common surfaces of the 3D control model.

3. The system of claim 1, wherein the predetermined plane is normal to the surface of the 3D control model.

4. The system of claim 1, wherein the processing circuitry positions the virtual cameras at the determined plurality of virtual camera locations in UV space; and the processing circuitry determines the real-life camera locations respectively corresponding to the plurality of virtual camera locations in 3D space using Barycentric coordinates.

5. The system of claim 1, wherein the plurality of virtual camera locations are stored as a template representing the 3D control model.

6. The system of claim 1, wherein components of the 2D control planar images are anchored to the plurality of components of the 3D control model; and components of the 2D target planar images are anchored to the plurality of components of the 3D target model.

7. The system of claim 1, wherein the validation output is an output image comprising a depiction of the target object with the at least one difference indicated.

8. The system of claim 1, wherein the camera placement algorithm determines the plurality of virtual camera locations by positioning the virtual camera locations on a surface of a bounding volume enclosing the 3D control model.

9. The system of claim 8, wherein the bounding volume comprises at least one of a bounding box or a bounding sphere enclosing the 3D control model.

10. The system of claim 1, wherein the plurality of real-life cameras comprises at least one of a depth camera, a LiDAR camera, a thermal camera, or an RGB camera.

11. A method for image-based validation of a target object relative to a 3D control model, the method comprising:

retrieving from non-volatile memory the 3D control model specifying orientations and coordinates of a plurality of components in a bill of materials;

identifying, from the 3D control model, the orientations and the coordinates for each of the plurality of components;

determining a plurality of virtual camera locations using a camera placement algorithm configured to compute a set of the plurality of virtual camera locations that enable a multi-view image capture of all the components of the 3D control model at respective orientations and coordinates of the plurality of components;

positioning virtual cameras at the determined plurality of virtual camera locations;

capturing, by a plurality of real-life cameras positioned at real-life camera locations respectively corresponding to the plurality of virtual camera locations, a 3D target model of the target object;

receiving the 3D target model captured by the plurality of real-life cameras;

generating 2D target planar images of the target object based on the 3D target model;

generating 2D control planar images of a control object based on the 3D control model, the 2D control planar images corresponding to the 2D target planar images of the target object;

detecting at least one difference between the 2D target planar images and the 2D control planar images;

generating a validation output indicating the at least one difference; and outputting the validation output, wherein according to the camera placement algorithm, the plurality of virtual camera locations to position the virtual cameras is determined by determining a minimum number of virtual camera locations which enables the multi-view image capture of all the components of the 3D control model at the respective coordinates of the plurality of components; and the minimum number of virtual camera locations is determined by grouping sets of the components relative to a predetermined plane that is associated with a surface of a part defined in the bill of materials of the 3D control model.

12. The method of claim 11, wherein the minimum number of virtual camera locations is determined by grouping the sets of the components into a plurality of common surfaces of the 3D control model.

13. The method of claim 11, wherein the predetermined plane is normal to the surface of the 3D control model.

14. The method of claim 11, wherein the virtual cameras are positioned at the determined plurality of virtual camera locations in UV space; and the real-life camera locations respectively corresponding to the plurality of virtual camera locations are determined in 3D space using Barycentric coordinates.

15. The method of claim 11, wherein the plurality of virtual camera locations are stored as a template representing the 3D control model.

16. The method of claim 11, wherein components of the 2D control planar images are anchored to the plurality of components of the 3D control model; and components of the 2D target planar images are anchored to the plurality of components of the 3D target model.

17. The method of claim 11, wherein the camera placement algorithm determines the plurality of virtual camera locations by positioning the virtual camera locations on a surface of a bounding volume enclosing the 3D control model.

18. The method of claim 17, wherein the bounding volume comprises at least one of a bounding box or a bounding sphere enclosing the 3D control model.

19. The method of claim 11, wherein the plurality of real-life cameras comprises at least one of a depth camera, a LiDAR camera, a thermal camera, or an RGB camera.

20. A system for image-based validation of a target aircraft relative to a 3D control model, the system comprising:

non-volatile memory storing instructions and the 3D control model depicting at least a portion of a control aircraft;

a plurality of real-life cameras disposed to capture a 3D target model of a portion of the target aircraft corresponding to the portion of the control aircraft;

processing circuitry, communicatively coupled to non-volatile memory storing and the plurality of real-life cameras, that executes the instructions to cause the processing circuitry to:

retrieve from the non-volatile memory the 3D control model specifying orientations and coordinates of a plurality of components in a bill of materials;

identify, from the 3D control model of the control aircraft, the orientations and the coordinates in UV space for each of the plurality of components;

determine a plurality of virtual camera locations using a camera placement algorithm configured to compute a set of the plurality of virtual camera locations that enable a multi-view image capture of all the components of the 3D control model at respective coordinates of the plurality of components;

position virtual cameras at the determined plurality of virtual camera locations;

determine a plurality of real-life camera locations respectively corresponding to the plurality of virtual camera locations in 3D space using Barycentric coordinates;

capture, by the plurality of real-life cameras positioned at the plurality of real-life camera locations respectively corresponding to the plurality of virtual camera locations, the 3D target model of the target aircraft;

receive the 3D target model captured by the plurality of real-life cameras;

generate 2D target planar images of the target aircraft based on the 3D target model;

generate 2D control planar images of the control aircraft based on the 3D control model, the 2D control planar images corresponding to the 2D target planar images of the target aircraft;

detect at least one difference between the 2D target planar images and the 2D control planar images;

generate a validation output indicating the at least one difference; and output the validation output, wherein according to the camera placement algorithm, the plurality of virtual camera locations to position the virtual cameras is determined by determining a minimum number of virtual camera locations which enables the multi-view image capture of all the components of the 3D control model at the respective coordinates of the plurality of components; and the minimum number of virtual camera locations is determined by grouping sets of the components relative to a predetermined plane that is associated with a surface of a part defined in the bill of materials of the 3D control model.

\* \* \* \* \*